United States Patent [19]

Takahashi

[11] Patent Number: 5,588,081
[45] Date of Patent: Dec. 24, 1996

[54] LIGHT COUPLING DEVICE TO COUPLE A LIGHT SOURCE TO AN OPTICAL FIBER

[75] Inventor: Mitsuo Takahashi, Matsudo, Japan

[73] Assignee: Seikoh Giken Co., Ltd., Matsudo, Japan

[21] Appl. No.: 448,981

[22] Filed: May 24, 1995

[30] Foreign Application Priority Data

Nov. 11, 1994 [JP] Japan ................................ 6-303041

[51] Int. Cl.$^6$ .................................................. G02B 6/42
[52] U.S. Cl. .................... 385/93; 385/34; 385/90
[58] Field of Search ............................. 385/34, 49, 88–94

[56] References Cited

U.S. PATENT DOCUMENTS

| | | | |
|---|---|---|---|
| H551 | 12/1988 | Chaoui et al. | 385/90 |
| 4,747,657 | 5/1988 | Chaoui et al. | 385/88 X |
| 4,915,470 | 4/1990 | Moore et al. | 385/94 |
| 5,050,953 | 9/1991 | Anderson et al. | 385/89 |
| 5,127,072 | 6/1992 | Blauvelt et al. | 385/88 |
| 5,257,336 | 10/1993 | Dautartas | 385/93 |

FOREIGN PATENT DOCUMENTS

| | | |
|---|---|---|
| 0441403 | 8/1991 | European Pat. Off. . |
| 611429 | 5/1979 | France . |
| 3413667 | 10/1985 | Germany . |
| 59-166906 | 9/1984 | Japan . |
| 01-077985 | 7/1989 | Japan . |

Primary Examiner—John D. Lee
Attorney, Agent, or Firm—Spencer & Frank

[57] ABSTRACT

A light coupling device for coupling a light source to an optical fiber. The device includes a first cylindrical sleeve carrying a GRIN lens and a ferrule. The ferrule receives the optical fiber. Movability of the ferrule along the optical axis of a first through-hole in the first sleeve allows a determination of a focal length between the GRIN lens and an incident end face of the optical fiber. A first setting means sets a relative position of the ferrule with respect to the first sleeve for holding the two in position with respect to one another when the GRIN lens and the incident end face of the optical fiber are separated by a distance equal to the focal length therebetween. The device further includes a second cylindrical sleeve. The first sleeve is coaxially disposed within a second through-hole of the second sleeve, and a light source unit is concentrically disposed within the second through-hole. Movability of the first sleeve along the optical axis of the second through-hole allows a determination of a focal length between the light source unit and the GRIN lens. A second setting means is disposed on the second sleeve for setting a relative position of the first sleeve with respect to the second sleeve for holding the two in position with respect to one another when the light source unit and the GRIN lens are separated by a distance equal to the focal length therebetween.

7 Claims, 5 Drawing Sheets

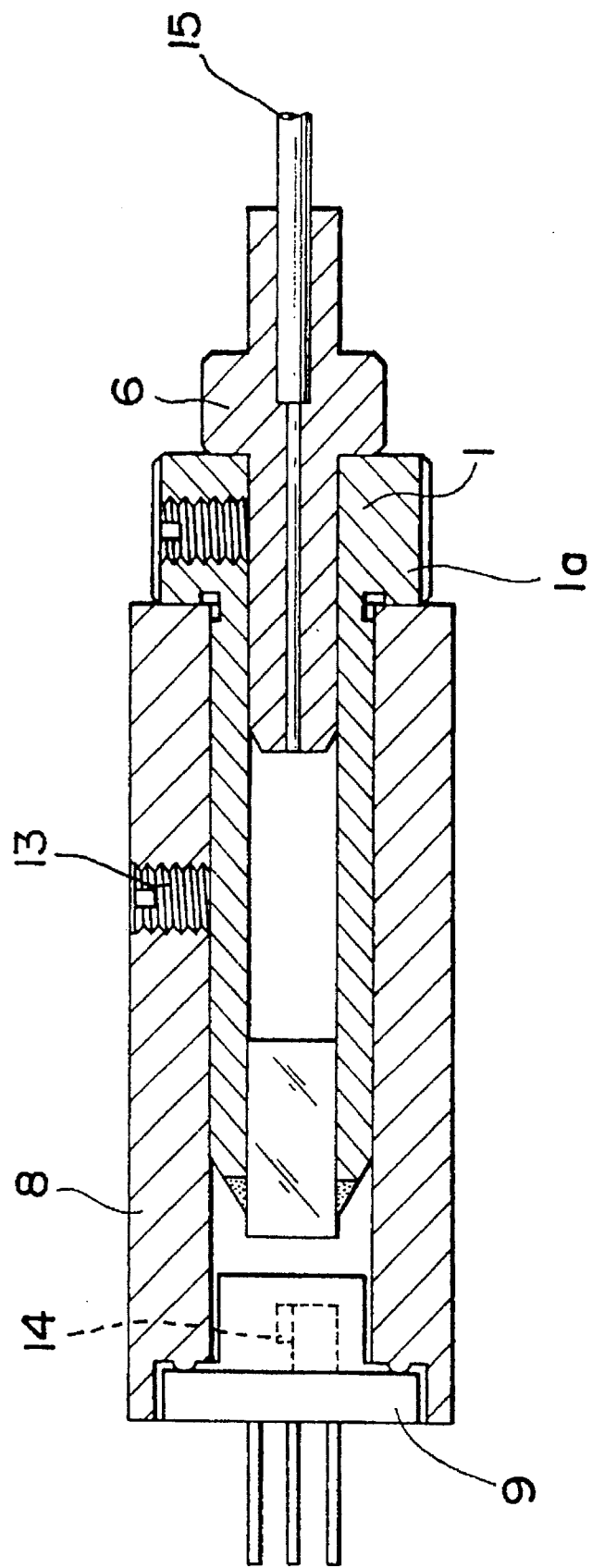

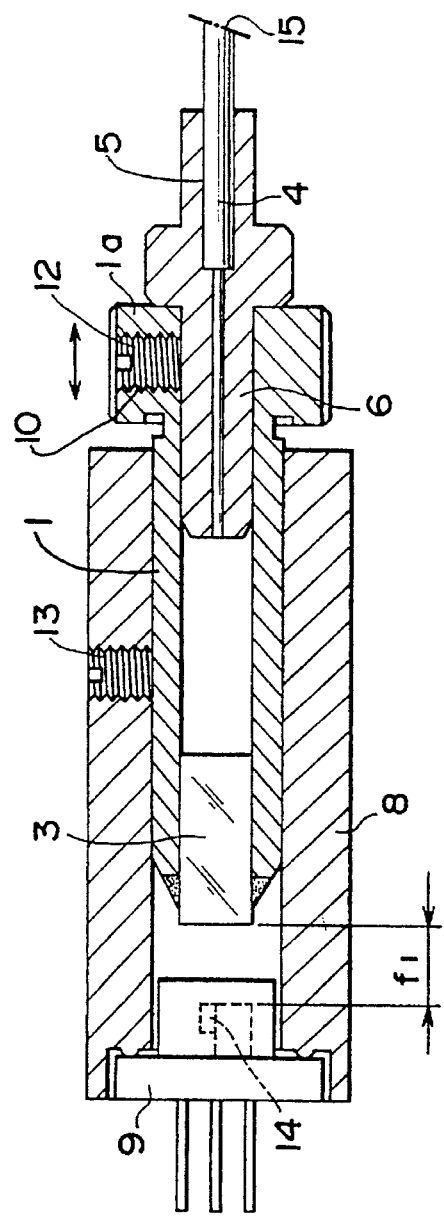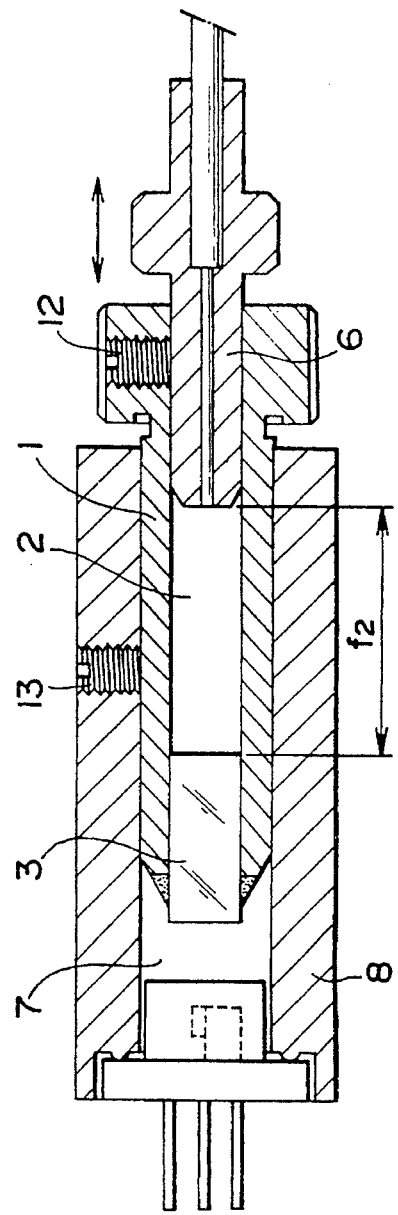

5,588,081

LIGHT COUPLING DEVICE TO COUPLE A LIGHT SOURCE TO AN OPTICAL FIBER

BACKGROUND OF THE INVENTION

1. Field of the Invention

The present invention relates to a light coupling device to couple a light source to an optical fiber, and more specifically to a light coupling device to couple a light source to an optical fiber which is constructed so that the focal length between the light source unit and a GRIN lens, and the focal length between the GRIN lens and the optical fiber end-face, or incident face, can be determined.

2. Prior Art

FIG. 4 shows a schematic diagram of a light coupling device to couple a light source to an optical fiber, which is constructed to feed light power radiated from the light source, i.e., a laser diode, to the optical fiber through a GRIN lens.

In FIG. 4, a can type light source unit 17 is provided, which includes at a central portion thereof a light emitting element 18. A graded index ("GRIN") lens 19 (a lens sold under the trademark "SELFOC" by the Nihon Ita Glass Co., Ltd.) is used to converge the light from the light emitting element 18. In a ferrule 20, there is provided an optical fiber consisting of a core 21 and a clad 22 which is inserted into a central hole 32 of the ferrule and fastened thereto.

A diverging light beam 23 is radiated from the emitting element 18, and includes rays in both the X and Y directions, the different directions corresponding to different magnitudes, respectively. The average radiation angle 2θ in each direction is approximately 50 degrees. The light beam is distributed in magnitude in accordance with the Gaussian distribution. The GRIN lens 19 is used to convert the light beam distributed over the wide angle into spot light beam 24 distributed within a small spot, so that the light power output from the GRIN lens 19 is gathered at the end-face of the optical fiber core 21.

A high light coupling efficiency may be attained by aligning the optical axes of the light emitting element 18 in the optical source unit 17, the GRIN lens 19, and the optical fiber core 21, and by optimizing: (1) the focal length $f_1$ between the end-face of the light emitting element 18 in the light source unit 17 and the GRIN lens 19, and (2) the focal length $f_2$ between the GRIN lens 19 and the end-face of the optical fiber core 21. Since the core diameter of the single-mode optical fiber measures 9 to 10 μm, the light source unit 17 according to the prior art cannot be precisely fabricated to satisfy the above efficiency requirement.

FIGS. 5A and 5B show the front and side views of light source unit 17 of FIG. 4, respectively. According to the conventional specifications concerning the light source unit 17, as shown in FIGS. 5A and 5B, the diameter of the circular mount of the light source unit 17 has a dimensional allowance of 50 μm. Moreover, the deviation "e" of the light emitting element 18 to the circular mount measures 100 μm between centers. Thus, the light emitting element 18 has a positioning error margin of 150 (=100+50) μm due to the above dimensional deviations. Moreover, positioning error Δ at the emitting end-face of the light emitting element 18 is 100 μm, referring to the center of the circular mount.

The preferable dimensional allowances of the light coupling device are as follows: The alignment error of the optical axes of the light emitting element 18 in the light source unit 17, the GRIN lens 19, and the optical fiber core 21 should be within 2 μm. The error of the focal length $f_1$ between the end-face of the light emitting element 18 in the light source unit 17 and the GRIN lens 19 should be within ±100 μm. The error of focal length $f_2$ between the GRIN lens 19 and the end-face of optical fiber core 21 should be within ±100 μm.

FIG. 6 shows a partial cross-sectional view of a conventional light coupling device. A light source unit 26 of FIG. 6 is not secured to a frame 28 in the upper portion of FIG. 6 (with respect to the center line of the device). However, the light source unit 26 shown in FIG. 6 is secured to the frame 28 in the lower portion of FIG. 6 with respect to the center line of the device. The optical axis of the light source unit 26 is aligned with the optical axis of a GRIN lens 27, and the light source unit 26 is thereafter mounted on the frame 28 by resistive welding. The frame 28 has conical projections 29. The conical projections 29 of the frame 28 are used for resistive welding (see the upper half portion of FIG. 6). When resistive welding is carried out, one of the conical projections 29 is deformed as shown in the lower portion of FIG. 6 so that the conical projection 29 becomes flat. In light coupling devices of the prior art, if the focal length $f_1$ between the light source unit 26 and the GRIN lens 27 shifts from the calculated value by Δf as shown in FIG. 6, disadvantageously, no adjustment can be carried out after the welding step.

As further shown in FIG. 6 a sleeve 31 into which a ferrule 30 is inserted is fastened to the frame 28. The light source unit is mounted on the frame after alignment of the optical axes is accomplished.

SUMMARY OF THE INVENTION

The object of the present invention is to present a light coupling device to couple a light source to an optical fiber, wherein the focal length $f_1$ between the light source unit and a GRIN lens and the focal length $f_2$ between the GRIN lens and an optical fiber core end-face can be determined during the assembling process of the device.

The invention concerns a light coupling device to couple a light source to an optical fiber in accordance with the present invention wherein a light power output from the light source unit, i.e., a laser diode, is gathered by a GRIN lens and then fed to the optical fiber. The device includes a light power receiving element assembly wherein the GRIN lens is mounted on one end of a first through-hole of a first cylindrical sleeve, and a ferrule with an optical fiber is inserted into the first through-hole from another end of the first through-hole so that the ferrule can move along the axis of the first through-hole. The device further includes a light source assembly comprising a second cylindrical sleeve which can concentrically couple with the first cylindrical sleeve of the light power receiving element assembly so that the first cylindrical sleeve can move along the optical axis of the second cylindrical sleeve within a second through-hole thereof, wherein a light source unit of the light source assembly is fastened to the second through-hole of the second cylindrical sleeve at one end thereof so that the gap between the inner diameter of the second through-hole of the second cylindrical sleeve and the outer diameter of the first cylindrical sleeve may be within a predetermined allowance. The predetermined allowance is specified as 2 μm.

The method of fabricating the light coupling device to couple the light source to the optical fiber in accordance with the present invention, comprises a first adjustment process to find a first focal length between the light source unit and the GRIN lens while the light power receiving element assembly is moved along the axis of the first cylindrical sleeve, the light power receiving element assembly being set in the second through-hole of the light source assembly, and the end-face of the optical fiber attached to the ferrule being connected to a light powermeter when the light source unit is kept on. The method further comprises a second adjustment process to find a second focal length between the GRIN lens and the end face of the optical fiber held within the ferrule while the ferrule, which is set in the first through-hole of the light power receiving element assembly, is moved along the axis of the first cylindrical sleeve.

In the aforementioned configuration of the present invention, the light power receiving element assembly and the ferrule with the optical fiber are placed in a position where the light powermeter indicates the maximum output during the first and second processes.

In the aforementioned configuration of the present invention, a first setscrew which fastens the inner surface of the first through-hole in the first cylindrical sleeve of the light source receiving element assembly to the outer surface of the ferrule with the optical fiber by pressing the ferrule to the other side is provided in one side of the first cylindrical sleeve. A second setscrew is provided in the second cylindrical sleeve on the same side as the first cylindrical sleeve. The second setscrew fastens the inner surface of the second through-hole in the second cylindrical sleeve of the light source assembly to the outer surface of the first cylindrical sleeve of the light power receiving element assembly by pressing the first cylindrical sleeve to the same side as the ferrule.

In the aforementioned configuration of the present invention, before the first and second lengths are adjusted, an adhesive agent is put on both the outer surface of the first cylindrical sleeve of the light power receiving element assembly and the outer surface of the ferrule in which the optical fiber is disposed.

BRIEF DESCRIPTION OF THE DRAWINGS

FIGS. 1A and 1B show an embodiment of a light coupling device to couple a light source to an optical fiber, wherein FIG. 1A shows a cross-sectional view of an embodiment of the light power receiving element assembly and FIG. 1B shows a cross-sectional view of a light source assembly;

FIG. 2 shows a cross-sectional view of the embodiment of the light coupling device of the present invention in assembled form;

FIGS. 3A shows a cross-sectional view of the device, indicating how to determine focal length $f_1$ between the light emitting element and a GRIN lens;

FIG. 3B shows a cross-sectional view of the device, indicating how to determine the focal length $f_2$ between the GRIN lens and the end-face of the ferrule with an optical fiber;

FIGS. 5A and 5B show a configuration of a conventional light source unit wherein FIG. 5A shows a cross-sectional front view of the light source and FIG. 5B shows a cross-sectional side view of the light source unit;

DETAILED DESCRIPTION OF THE PREFERRED EMBODIMENTS

The present invention is described hereafter with reference to the drawings.

Figure 1A:
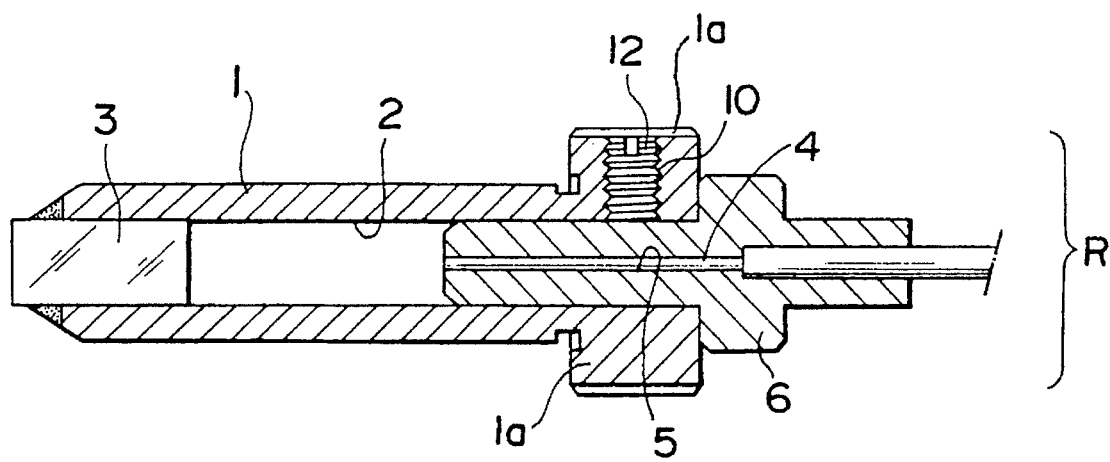
Figure 1B:
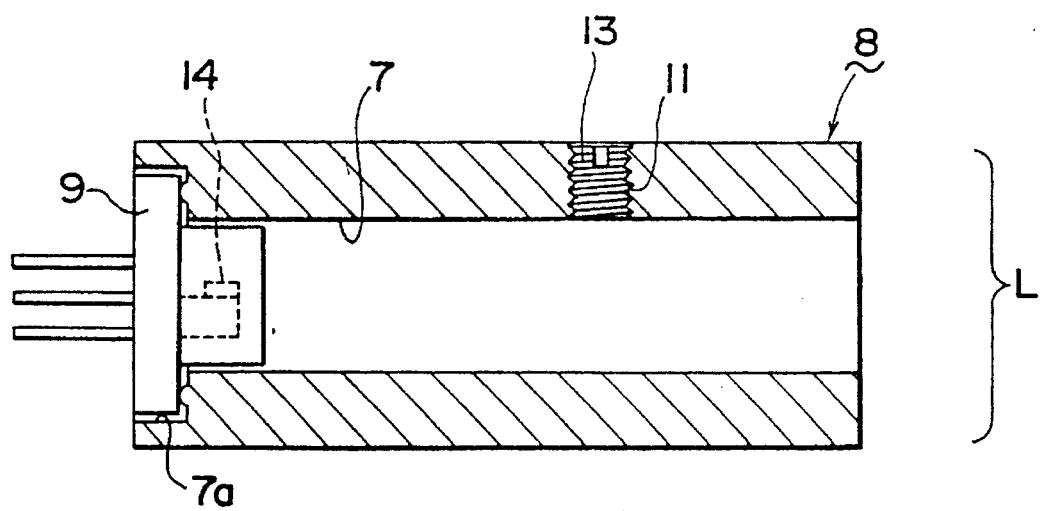
Figure 4:
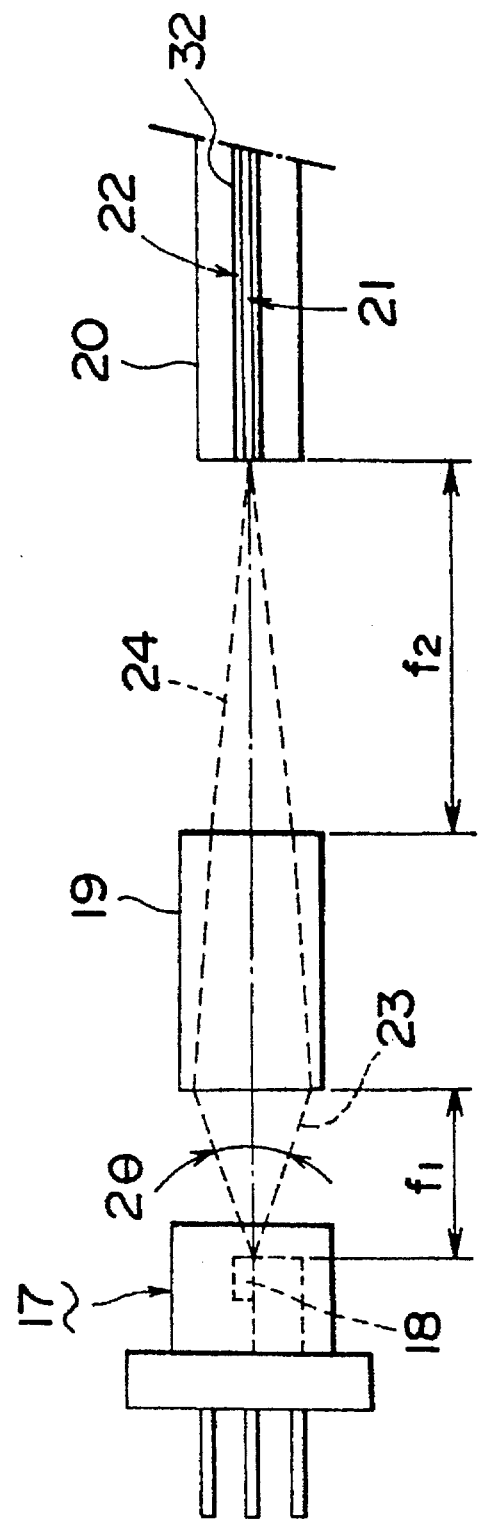
FIG. 4 shows a layout of the components of a conventional light coupling device to couple a light source to an optical fiber, wherein light power radiating from the light source, i.e., a laser diode, is fed to the optical fiber through the GRIN lens.
Figure 5A:
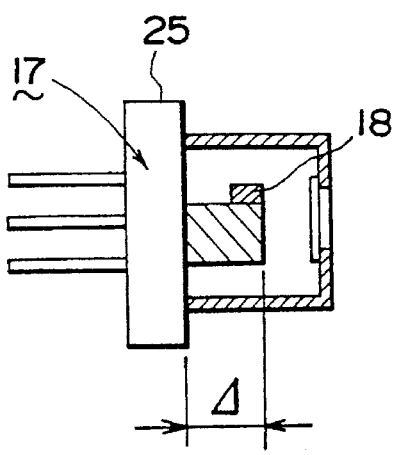
Figure 5B:
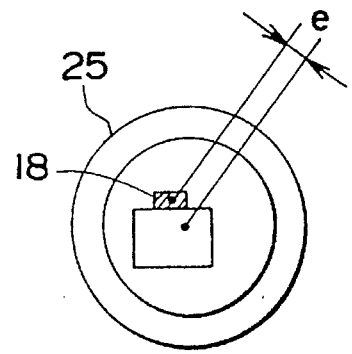
Figure 6:
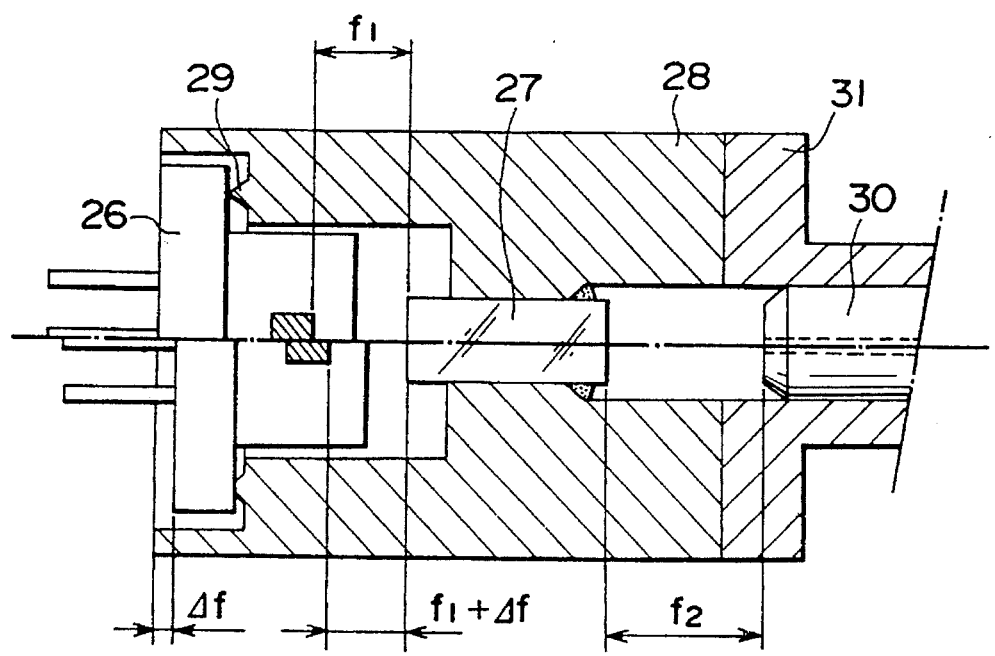
FIG. 6 shows a cross-sectional view of a conventional light coupling device.

In FIGS. 1A and 1B there is shown an embodiment of a light coupling device to couple a light source to an optical fiber in accordance with the present invention. FIG. 1A shows a cross-sectional view of a light power receiving element assembly and FIG. 1B shows a cross-sectional view of a light source assembly of the present invention. FIG. 2 shows a cross-sectional view of the light coupling device of the present invention. The light power receiving element assembly of FIG. 1A is set in the light source assembly of FIG. 1B, as shown in FIG. 2. FIGS. 3A and 3B show the cross-sectional views of the device, respectively. FIG. 3A shows the cross-sectional view of the device, indicating how to find and adjust the focal length $f_1$ between the light source unit and the GRIN lens. FIG. 3B shows the cross-sectional view of the device, indicating how to find and adjust the focal length $f_2$ between the GRIN lens and the input end of the ferrule with an optical fiber.

In FIG. 1A, a GRIN lens 3 is secured to one end of a through-hole 2 of a cylindrical sleeve 1. An optical fiber 4 is inserted into a central hole 5 of a ferrule 6. The ferrule 6 is received in the cylindrical sleeve 1 at the other end thereof. A thread 10 is arranged in part of a flange 1a of the cylindrical sleeve 1. A setscrew 12 mates with the thread 10. The light power receiving element assembly R shown in FIG. 1A consists of the cylindrical sleeve 1 and ferrule 6 with an optical fiber. As shown in FIG. 1B the light source unit 9 is concentrically installed in through-hole 7a of a cylindrical sleeve 8, wherein a through-hole 7 is provided to receive light power receiving element assembly R therein so that light power receiving element assembly R can move along the axis of the cylindrical sleeve 8 without any substantial play, and secured there after the alignment or adjustment of the device is established. A light emitting element 14 is placed in the interior of the light source unit 9. A thread 11 is provided in the middle of the cylindrical sleeve 8 so that the thread 11 can mate with a setscrew 13.

The light source assembly L shown in FIG. 1B consists of the cylindrical sleeve 8 and the light source unit 9. The light power receiving element assembly R is coupled to the light source assembly L, as shown in FIG. 2. The length between the end-face of the light emitting element 14 in the light source unit 9 and the GRIN lens 3 is adjusted to the focal length $f_1$ as shown in FIG. 3A.

The other end-face 15, i.e., the output end of the optical fiber 4 is connected to a light powermeter (not shown). Thereafter, light power receiving element assembly R is moved forwards or backwards along the optical axis thereof while the light power is output from the light source unit 9. The light power receiving element assembly R is stopped at the position where the light power, measured by the light powermeter, is maximum, and fastened at the above position by the setscrew 13 so as to keep focal length $f_1$.

The length between the GRIN lens 3 and the end-face of ferrule 6 with the optical fiber is adjusted to the focal length $f_2$ as shown in FIG. 3B. The ferrule 6 with the optical fiber 4, which is set in the through-hole 2 of light power receiving element assembly R, is moved forwards or backwards along the optical axis thereof. The ferrule 6 with the optical fiber 4 is stopped at the position where the light power displayed on the light powermeter is maximum, and the ferrule with the optical fiber 4 is secured at the above position by the setscrew 13 so as to keep the focal length $f_2$. A setscrew 12 is used to fasten the ferrule 6 with optical fiber 4 to the cylindrical sleeve 1, eliminating in the other side the gap between the ferrule 6 with the optical fiber 4 and the inner surface of cylindrical sleeve 1 of the light power receiving element assembly R.

The setscrew 13 is used to secure the cylindrical sleeve 1 to the cylindrical sleeve 8, eliminating the gap in the other side between the inner surface of the through-hole 7 of the cylindrical sleeve 8 of the light source assembly L and the outer surface of the cylindrical sleeve 1 of the light power receiving element assembly R. The gap between the inner surface of the cylindrical sleeve 8 of the light source assembly L and the cylindrical sleeve 1 of the light power receiving element assembly R is specified as 1 to 2 μm or less for the precisely fabricated product. The gap between the inner surface of the cylindrical sleeve 1 of the light power receiving element assembly R and the outer surface of the ferrule 6 with the optical fiber 4 is specified as 1 to 2 μm or less for the precisely fabricated product. The outer surface of the cylindrical sleeve 1 of the light power receiving element assembly R and the outer surface of the ferrule 6 with the optical fiber 4 may be covered with an adhesive agent of epoxy resin such that the inner space of the device is sealed from outer atmosphere completely.

As described heretofore, the light coupling device to couple the light source to the optical fiber, in accordance with the present invention, consists of a light power receiving element assembly wherein the GRIN lens is fastened to one end of a first through-hole of a first cylindrical sleeve and a ferrule with an optical fiber is inserted into another end of the first through-hole of the first cylindrical sleeve so that the ferrule can move along the optical axis of the first through-hole. In the light source assembly, the first cylindrical sleeve of the light power receiving element assembly can move along the optical axis of a second cylindrical sleeve, and the light source unit is concentrically aligned, or coaxial with a second through-hole of the second cylindrical sleeve. The second cylindrical sleeve can mate with the outer surface of the first cylindrical sleeve within a predetermined allowance. Moreover, the first cylindrical sleeve can be secured at a given position at one end of the second cylindrical sleeve. According to the above configuration, the focal length $f_1$ between the light emitting element of the light source and the GRIN lens, and the focal length $f_2$ between the GRIN lens and the end-face of the optical fiber can separately be determined.

In the conventional device, if a length $f_1$ between a light emitting element of a light source is once secured, it can not be adjusted. On the contrary in the device according to the present invention the distance between the light emitting element and the GRIN lens can be re-adjusted even after the adjustment is completed in the light coupling device. The construction of the light coupling device in accordance with the present invention is more simplified when compared with the construction of conventional devices. In accordance with the present invention, a high light coupling efficiency can be accomplished by separately adjusting the distance between the light emitting element and the GRIN lens to a focal length $f_1$, and the distance between the GRIN lens and the input end of the optical fiber to a focal length $f_2$.

While the present invention has been described above only with respect to one embodiment thereof, it should of course be understood that the present invention should not be limited only to the described embodiment, but that various changes or modifications may be made without departure from the scope of the present invention as defined by the appended claims.

What is claimed is:

1. A light coupling device for coupling a light source to an optical fiber comprising:

a light power receiving element assembly including:
 a first cylindrical sleeve defining a first through-hole therein, said first through-hole having a first end, a second end and an optical axis;
 a GRIN lens positioned within the first end of the first through-hole of said first cylindrical sleeve;
 a ferrule adapted to receive the optical fiber therein, the ferrule being disposed within the second end of the first through-hole of said first cylindrical sleeve so as to be movable along the optical axis of said first through-hole, movability of the ferrule along the optical axis of said first through-hole allowing a determination of a focal length between the GRIN lens and an incident end face of the optical fiber; and
 a first setting means disposed on the first cylindrical sleeve for setting a relative position of the ferrule with respect to the first cylindrical sleeve, the ferrule and the first cylindrical sleeve thereby being held in position with respect to one another when the GRIN lens and the incident end face of the optical fiber are separated by a distance equal to the focal length therebetween; and a light source assembly including:
 a second cylindrical sleeve defining a second through-hole therein having a first end, a second end and an optical axis, the first cylindrical sleeve being coaxially disposed within the second end of the second through-hole of said second cylindrical sleeve so as to be movable along the optical axis of the second through-hole;
 a light source unit concentrically disposed within the second through-hole at the first end thereof, movability of the first cylindrical sleeve along the optical axis of the second through-hole allowing a determination of a focal length between the light source unit and the GRIN lens; and
 a second setting means disposed on the second cylindrical sleeve for setting a relative position of the first cylindrical sleeve with respect to the second cylindrical sleeve, the first cylindrical sleeve and the second cylindrical sleeve thereby being held in position with respect to one another when the light source unit and the GRIN lens are separated by a distance equal to the focal length therebetween.

2. The light coupling device according to claim 1, wherein the focal length between the light source unit and the GRIN lens and the focal length between the GRIN lens and the incident end face of the optical fiber are respectively determined when a light powermeter connected to an output end face of the optical fiber when light power is being radiated from the light source unit indicates maximum output power.

3. The light coupling device according to claim 1, wherein the first cylindrical sleeve is disposed within the second through-hole of the second cylindrical sleeve so as to define a gap between an outer surface of the first cylindrical sleeve and an inner surface of the second cylindrical sleeve, the gap being within a predetermined allowance of 2 μm.

4. The light coupling device according to claim 1, wherein:

the first setting means comprises:
 a first thread disposed on the first cylindrical sleeve such that, when the ferrule is disposed within the first through-hole, the first thread is adjacent a first side of an outer surface of the ferrule; and a first setscrew adapted to be threaded into the first thread for fastening the ferrule to the first cylindrical sleeve by pressing on the first side of the outer surface of the ferrule thereby eliminating a gap defined between a second side of the outer surface of the ferrule and an inner surface of the first cylindrical sleeve; and the second setting means comprises:

a second thread disposed on the second cylindrical sleeve such that, when the first cylindrical sleeve is disposed within the second through-hole, the second thread is adjacent a first side of an outer surface of the first cylindrical sleeve; and a second setscrew adapted to be threaded into the second thread for fastening the first cylindrical sleeve to the second cylindrical sleeve by pressing on the first side of the outer surface of the first cylindrical sleeve thereby eliminating a gap defined between a second side of the outer surface of the first cylindrical sleeve and an inner surface of the second cylindrical sleeve.

5. The light coupling device according to claim 4, wherein:

an outer surface of the first cylindrical sleeve is covered with a first layer of adhesive for cooperating with the first setting means for setting a relative position of the ferrule with respect to the first cylindrical sleeve; and an outer surface of the ferrule is covered with a second layer of adhesive for cooperating with the second setting means for setting a relative position of the first cylindrical sleeve with respect to the second cylindrical sleeve.

6. A method of adjusting the light coupling device according to claim 1, comprising the steps of:

radiating light power from the light source unit;

determining the focal length between the light source unit and the GRIN lens by moving the first cylindrical sleeve along the optical axis of the second cylindrical sleeve during the step of radiating;

setting a relative position of the first cylindrical sleeve with respect to the second cylindrical sleeve after the step of determining the focal length between the light source unit and the GRIN lens for holding the first cylindrical sleeve and the second cylindrical sleeve in position with respect to one another when the light source unit and the GRIN lens are separated by a distance equal to the focal length therebetween;

determining the focal length between the GRIN lens and the incident end face of the optical fiber by moving the ferrule together with the optical fiber received therein along the optical axis of the first cylindrical sleeve during the step of radiating and after the step of setting a relative position of the first cylindrical sleeve; and setting a relative position of the ferrule with respect to the first cylindrical sleeve after the step of determining the focal length between the GRIN lens and the incident end face of the optical fiber for holding the ferrule and the first cylindrical sleeve in position with respect to one another when the GRIN lens and the incident end face of the optical fiber are separated by a distance equal to the focal length therebetween.

7. The method according to claim 6, further comprising the step of connecting a light powermeter to an output end face of the optical fiber for indicating an output power from the optical fiber when light power is being radiated from the light source unit, the focal length between the light source unit and the GRIN lens and the focal length between the GRIN lens and the incident end face of the optical fiber being respectively determined when the light powermeter indicates a maximum output power.

* * * * *